(12) United States Patent
Sivula

(10) Patent No.: US 6,795,711 B1
(45) Date of Patent: Sep. 21, 2004

(54) MULTIMEDIA MESSAGE CONTENT ADAPTATION

(76) Inventor: Timo Sivula, Hämeenkyläntie 23, FIN-02660, Espoo (FI)

( * ) Notice: Subject to any disclaimer, the term of this patent is extended or adjusted under 35 U.S.C. 154(b) by 0 days.

(21) Appl. No.: 09/414,178

(22) Filed: Oct. 7, 1999

(51) Int. Cl.[7] .............................................. H04Q 7/20
(52) U.S. Cl. .................... 455/466; 455/418; 455/414.1; 709/217; 709/206
(58) Field of Search ............................... 455/414, 422, 455/466, 553, 554, 557, 445, 412, 413, 558, 426; 709/219, 206, 207, 217; 713/202

(56) References Cited

U.S. PATENT DOCUMENTS

| | | | | |
|---|---|---|---|---|
| 5,329,578 A | * | 7/1994 | Brennan et al. | 379/211.03 |
| 5,426,594 A | | 6/1995 | Wright et al. | 364/514 R |
| 5,719,918 A | * | 2/1998 | Serbetcopiouglu et al. | 455/466 |
| 5,768,509 A | | 6/1998 | Günlük | 395/200.33 |
| 5,794,142 A | | 8/1998 | Vanttila et al. | 455/419 |
| 5,845,203 A | * | 12/1998 | LaDue | 455/414 |
| 5,870,683 A | | 2/1999 | Wells et al. | 455/566 |
| 5,878,351 A | | 3/1999 | Alanara et al. | 455/466 |
| 5,903,726 A | | 5/1999 | Donovan et al. | |
| 5,946,630 A | * | 8/1999 | Willars et al. | 455/466 |
| 5,946,663 A | | 8/1999 | Tanaka et al. | 455/466 |
| 6,032,023 A | * | 2/2000 | Foladare et al. | 455/31.3 |
| 6,081,262 A | * | 6/2000 | Gill et al. | 345/302 |
| 6,085,099 A | * | 7/2000 | Ritter et al. | 455/466 |
| 6,125,281 A | * | 9/2000 | Wells et al. | 455/466 |
| 6,151,491 A | * | 11/2000 | Farris et al. | 455/412 |
| 6,167,253 A | * | 12/2000 | Farris et al. | 455/412 |
| 6,192,111 B1 | * | 2/2001 | Wu | 379/88.13 |
| 6,230,004 B1 | * | 5/2001 | Hall et al. | 455/414 |
| 6,292,668 B1 | * | 9/2001 | Alnara et al. | 455/466 |
| 6,321,257 B1 | * | 11/2001 | Kotola et al. | 709/219 |
| 6,324,650 B1 | * | 11/2001 | Ogilvie | 713/202 |
| 6,360,252 B1 | * | 3/2002 | Rudy et al. | 709/206 |
| 6,400,272 B1 | * | 6/2002 | Holtzman et al. | 340/572.1 |
| 6,400,958 B1 | * | 6/2002 | Isomursu et al. | 455/466 |
| 6,453,340 B1 | * | 9/2002 | Emura | 709/206 |

FOREIGN PATENT DOCUMENTS

| | | |
|---|---|---|
| EP | 0785661 | 7/1997 |
| WO | 9732439 | 9/1997 |
| WO | WO9856197 | 12/1998 |

OTHER PUBLICATIONS

European Patent Office Search Report dated Jun. 27, 2002 (3pp).
Article from Computer Communications: Title: A Technique for Multi–Network Access to Multimedia Messages—Authors A.Patel and K.Gaffney.

* cited by examiner

*Primary Examiner*—Erika Gary
*Assistant Examiner*—Joy K. Contee (57) ABSTRACT

Adaptation of special content messages between mobile telephones of different capabilities is carried out by a special application service center that receives a special content message from an originating mobile station and, in response thereto, sends a short message using the existing short message service to an addressed terminating mobile station with a notification of the nature of the intended special content message, as well as an indication of an alternative method of receiving the special content message if the terminating mobile station is not capable of processing the special content message, for instance, a URL which the user can consult using his personal computer over the internet. If the terminating mobile station is capable of receiving the special content message, it signals the special application service center which, after authentication, then forwards the special content message to the terminating mobile station for processing.

10 Claims, 5 Drawing Sheets

MULTIMEDIA MESSAGE CONTENT ADAPTATION

TECHNICAL FIELD

This invention relates to mobile communications and, more particularly, to adapting messaging content between different types of mobile terminal stations with minimal need for signaling.

BACKGROUND OF THE INVENTION

Mobile telephone systems are evolving beyond the known voice communications. For instance, one GSM operator offers a service where a short message can be sent to a dedicated server, requesting the server to send a greeting card via surface mail to the recipient. The user with a PC accesses a web page where the available postcards are listed and chooses one of the cards. Each card has a unique ID. The user writes a short message using his GSM cellular phone containing fields such as card ID, name of recipient, address of recipient, and greeting. He then sends the short message to a dedicated server. Upon receipt of the message, the server sends the requesting cellular phone a confirmation (SMS) message if the message was acceptable and a charge is added to the user's phone bill. Otherwise, an error SMS message is sent back to the cellular phone without any charge being registered. If everything was acceptable, then the mailman carries a real, physical postcard containing the greetings to the recipient.

New services are evolving on the Internet as well. A popular new service provided on the internet is to send yourself, or anyone you know, a virtual greeting card. The recipient will receive an e-mail containing a URL pointing to the place where he can fetch his virtual greeting card or multimedia file. The notification is similar every time, simply containing the URL and perhaps a password or other identification information. Such pages are becoming ubiquitous.

An electronic greeting card store is known for mobile communications from U.S. Pat. No. 5,426,594 to Wright et al. Wright et al show an electronic greeting card communication system that includes a first personal communicator, an electronic mail server, and a second personal communicator. The first communicator accepts off-line selection of an electronic greeting card from a user, and then transmits a request message corresponding to the off-line-selection. The electronic mail server receives the request message and then wirelessly transmits an electronic greeting card message to the second personal communicator. The second personal communicator selectively receives the wireless transmitted electronic greeting card message and presents it to a user.

In recent years, data services have become popular for mobile communications systems, including the very popular short messaging service (SMS) that employs underutilized bandwidth of signaling channels to allow short text messages. A new use for SMS is a picture messaging application for cellular telephones that is presently being offered by the assignee hereof for allowing users to create and download picture messages into his or her proprietary mobile telephone (e.g., Nokia 3210 GSM) and send them to another, like proprietary telephone (another Nokia 3210 or a Nokia 8210 or Nokia 8850). With a likewise proprietary messaging platform (e.g., Nokia Artus Messaging Platform), operators are able to enhance usage of Short Message Service (SMS) for their subscribers. Such a simple graphic message service provides a black-and-white picture, for instance 72×28 pixels, along with a short greeting displayed below the picture. A maximum size of the greeting is specified, for example 120 characters.

The popularity of the internet and the coming explosion of bandwidth therein points to new multimedia services, including picture, data, text, video, as well as audio being offered in future generation mobile communication networks.

It can be foreseen that simple graphic message services for mobile communications systems will evolve into more capable image message services with. It is already possible to send a (reduced size) JPEG file with personal contact information from a Nokia 9110 communicator to another such communicator using several messages to send the information. SMS (or paging) messages are not particularly good for JPEG or multimedia files, due to their low bandwidth. Although the simple graphic message service described above can be provided with platforms similar to SMS, such an image message service evolution will eventually require more capable image message service centers (IMSC) to perform the store and forward operations. Beyond that, multimedia message services are foreseen that enable messaging with full content versatility, including images, audio, video, data and text from terminal to terminal or from terminal to internet. Instead of an IMSC, a multimedia message service center (MMSC) is foreseen.

A communication network terminal supporting a plurality of applications is known from WO 97/32439. This patent publication discloses a method for routing an inbound SMS message to an application based on the header information in the received message. Older cellular phones, and even newer ones, may not display the received message or they do not have the capability to show specially-formatted messages. Normally they will display a message to the user saying "data message, cannot display content", or similar, especially if the message contains a lot of data.

A problem with developing all of these different capabilities in parallel with an operating and evolving infrastructure is that many different types of content are being used, and users wish to be able to send their messages, regardless of type, from one phone to another, and not meet with refusal or total incapability on the part of the recipient to receive a given type of content. Although not all phones support every type of simple image, JPEG image, video, animation or the like, most phones likely have some capability. The receiving phone may, for instance, not have a graphic display or its display capabilities may be insufficient to display the image sent by the sending phone but may be able to handle SMS. Presently, images can only be sent to phones that are known to have the required image or multimedia capabilities. If an image message is sent to a phone that cannot show the image, the message is lost. The problem is how to adapt the content automatically so that it, or a part of the content, can be presented by most any phone.

DISCLOSURE OF INVENTION

An object of the present invention is to show how an image message can be adapted to the capabilities of the receiving terminal so that, even if the terminal cannot display the message fully, the message is not lost, but is adapted to the capabilities of the receiving terminal, and the user is provided with alternative means to view the content.

According to a first aspect of the invention, a method for use by a mobile station in a mobile communications system in receiving a service from an application service center, comprises the steps of the mobile station receiving a short message, the mobile station determining whether the short message indicates that a special application is required in the mobile station and, if not, processing the short message as a short message and, if so, determining whether the special application is supported in the mobile station and, if not, processing the short message as a short message and, if so, requesting an application service center to provide a service usable according to the special application, the mobile station receiving the service in the form of a special content message from the application service center, and the mobile station processing the special content message according to the special application.

According to a second aspect of the invention, a method for use by an application service center in providing a special content message provided by an originating mobile station in a mobile communications system to a terminating mobile station in the system, comprises the steps of the center receiving the special content message from the originating mobile station with a request to send the special content message to the terminating mobile station and providing a short message to the terminating mobile station with a part of the short message indicating that a special application is required in the terminating mobile station to fully process the special content message and with a textual part of the short message for use by the terminating mobile station in the event that the special application is not supported by the terminating mobile station, the center receiving a request from the terminating mobile station that the special content message be sent, and the center sending the special content message to the terminating mobile station in response to the request from the terminating mobile station or in the absence of a request from the terminating mobile station, posting the special content message on an internet web page accessible according to the textual part of the short message.

According to a third aspect of the invention, a method for use in a mobile communications system including an application service center for providing a special content message provided by an originating mobile station of the system to a terminating mobile station of the system comprises the steps of the center receiving the special content message from the originating mobile station with a request to send the special content message to the terminating mobile station and providing a short message to the terminating mobile station with a part of the short message indicating that a special application is required in the terminating mobile station to fully process the special content message and with a textual part of the short message for use by the terminating mobile station in the event that the special application is not supported by the terminating mobile station, the terminating mobile station receiving the short message, the terminating mobile station determining whether the short message indicates that a special application is required in the terminating mobile station and, if not, processing the short message as a short message and, if so, determining whether the special application is supported in the terminating mobile station and, if not, processing the short message as a short message and, if so, sending a request to the application service center to provide the special content message, the center receiving the request from the terminating mobile station that the special content message be sent, the center sending the special content message to the terminating mobile station, the terminating mobile station receiving the special content message from the application service center, and the terminating mobile station providing the special content message to the user according to the special application.

According to a fourth aspect of the invention, a mobile station for use in a mobile communications system for receiving a service from an application service center, comprises means for receiving a short message, means for determining whether the short message indicates that a special application is required in the mobile station and, if not, processing the short message as a short message and, if so, determining whether the special application is supported in the mobile station and, if not, processing the short message as a short message and, if so, requesting that the application service center provide a special content message for processing in the mobile station according to the special application, means for receiving the special content message from the application service center, and means for providing the special content message to a user of the mobile station according to the special application.

According to a fifth aspect of the invention, an application service center for use in providing a special content message requested or provided by an originating mobile station in a mobile communications system to a terminating mobile station in the system comprises means for receiving the special content message from the originating mobile station with a request to send the special content message to the terminating mobile station, means for providing a short message to the terminating mobile station with a part of the short message indicating that a special application is required in the terminating mobile station to fully process the special content message and with a textual part of the short message for use by the terminating mobile station in the event that the special application is not supported by the terminating mobile station, means for posting said special content message to a web page accessible according to said short message in said event, means for receiving a request from the terminating mobile station that the special content message be sent, and means for sending the special content message to the terminating mobile station.

According to a sixth aspect of the invention, a mobile communications system comprises an originating mobile station for providing a special content message with a destination address, a terminating mobile station with the destination address provided by the originating mobile station for receiving the special content message, an application service center for receiving the special content message from the originating mobile station with a request to send the special content message to the terminating mobile station, the center for providing a short message to the terminating mobile station with a part of the short message indicating that a special application is required in the terminating mobile station to fully process the special content message and with a textual part of the short message for use by the terminating mobile station in the event that the special application is not supported by the terminating mobile station and including means for posting said special content message to a web page accessible according to said short message in said event, wherein the terminating mobile station includes means for receiving the short message, means for determining whether the start message indicates that a special application is required in the terminating mobile station and, if not, processing the short message as a short message and, if so, determining whether the special application is supported in the terminating mobile station and, if not, processing the short message as a normal short message and, if so, sending a request to the application service center to provide a service usable according to the special application, the center having means for receiving the request from the terminating mobile station that the special content message be sent, as well as means for sending the special content message to the terminating mobile station, wherein the terminating mobile station has means for receiving the special content message from the application service center, as well as means for providing the special content message to a user of the terminating mobile station according to the special application.

Content adaptation taught by the present disclosure, if attempted according to the prior art, might have been done by negotiation between the phone and the server. The drawbacks of such an approach would be delays due to protocol handshakes and acknowledgements and additionally, capability negotiation would waste valuable bandwidth. In addition, the indirect result would be the need for an equipment register in the server, thereby increasing the server complexity. With the presented form of in-band signaling, the capability negotiation is done in one single message, with no need for retransmissions to negotiate content adaptation.

The functionality of the invention is not limited to phones supporting a particular vendor's messaging, since the signaling is based on normal SMS. Therefore, any vendor's phone could be used to receive the special content message. As any terminal can be used to receive special content messages, the takeoff of multimedia messaging services can be greatly speeded up, as there is no need to wait for a sufficient number of terminals to be distributed to the market before launch service will be effective. After receiving a few of the adapted special content messages, the receiving user will surely become interested in buying a phone that can display the whole special content message. Therefore, each adapted SMS is, in fact, an advertisement for the special application phone capable of displaying special content messages. Rapid deployment of the new service will shorten payback time of investments made.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
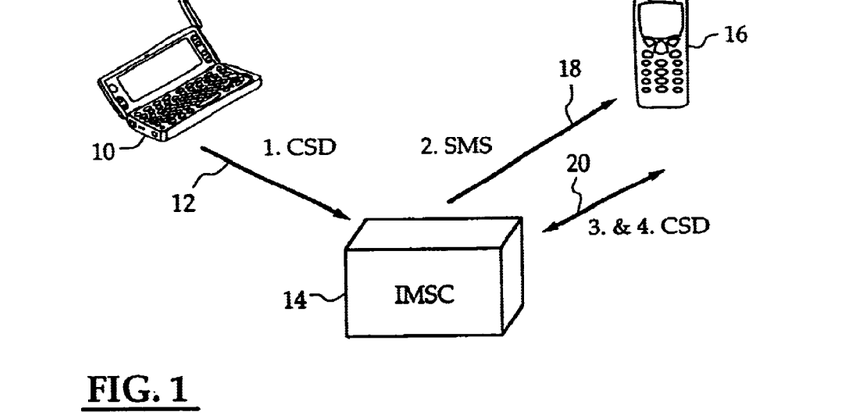
FIG. 1 shows a special application service center, according to the present invention, capable of adapting a special content message from an originating mobile station to a terminating mobile station.

FIG. 1 shows an originating mobile station 10 sending a special content message on a signal line 12 to a special application service center 14, which in this case includes a special application service center in the form of an Image Messaging Service Center (IMSC). The special application service center is able to process the special content message and post it to the internet if necessary, as explained below. The originating mobile station 10 may be a communicator such as a Nokia 9110 with a special application program giving it the ability to form special content messages that include both text and images. Wireless communication systems are expected to gradually evolve, first from mostly voice and limited data generally in use today, to fairly primitive (72×28 pixels) black-and-white images using existing short message service centers, second to image messaging with JPEG pictures or equivalent along with concatenated short messages, and finally to multimedia messages with picture, data, text, audio and video. Without limitation, the special application service center 14 of the present invention could therefore be for providing simple graphic message services (GSMC), image message services (IMSC), multimedia services (MMSC), or the like.

When such a service center 14 receives a special content message, such as the message on line 12 of FIG. 1 from an originating mobile station 10 having the capability to provide the special content message, it is not necessarily the case that a terminating mobile station 16 that is addressed-by the originating mobile station 10 is fully capable of processing the special application message. It may, for instance, be a presently available Nokia 3110 or an earlier Nokia 1610 (SMS capable with software V5.02 or later) that is only capable of reading the text part, as provided, for instance, by a short message of a short message service that is embodied in the special application service center or is separate therefrom.

According to the present invention, the special application service center 14 does not merely provide a store-and-forward function, and therefore it does not simply relay the special application message from the originating mobile station 10 to the addressed terminating mobile station 16. Instead, it first sends a short message signal on a line 18 to the terminating mobile station 16 using the known Short Message Service (SMS) which employs underutilized bandwidth of signaling channels for transmitting short text messages, much like those of a pager. It should be realized that the use of the term "short message" or "short message service" herein encompasses any kind of narrowband method, such as paging, out-of-band transmissions and the like, and not just the known SMS. The short message sent on the line 18 may include a unique password that is generated by the special application service center 14 and that is associated with this specific message. The short message sent on the line 18 to the terminating mobile station may therefore include a textual part such as the following:

$There is a postcard for you at the following address: htt://www.abcdefgh.com/directory/filename.html. Userid is MSISDNNUMBER and your password is PASSWORD.

Or, the need for passwords can be eliminated by storing each file in a different directory. Using a different directory every time gives the same protection as a password. The file can be named in a way that indicates to the recipient the requirements necessary to process the special content message. If the short message received by the terminating mobile station 16 on the line 18 indicates an application that the terminating mobile station 16 is capable of processing, e.g., by recognizing the directory, the file, or the starting string of the message on the line 18: "$There is a postcard for you at the following address:", the URL, the directory, or file, it starts an interchange between the terminating mobile station 16 and the special application service center 14 in order to cause the service center 14 to send the special content message to the terminating mobile station so that it can be processed according to the corresponding special application and provided to the user via the terminating mobile station 16. This interchange is symbolized by a bidirectional signal line 20.

Meanwhile, the special application service center 14 has stored the special content message received on the line 12 from the originating mobile station 10 in a memory device resident in the service center 14. If the terminating mobile station 16 does not request the special content message, or if it sends a message back indicating it is not capable, the service center 14 then retrieves the special content message from memory and posts the special content message on a web page having a domain name or URL identified in the short message already sent to the terminating mobile station. In this way, if the terminating mobile station 16 is not capable of processing the special content message, the user can nevertheless read the short message and go to the nearest personal computer or workstation connected to the internet and view the special content message at the URL specified in the short message provided on the line 18, e.g., using the USERID and/or PASSWORD also provided with the short message. In this way, the present invention solves the problem of having a highly capable mobile station trying to send messages to mobile stations that are not so capable but which nevertheless can be utilized by the user in conjunction with a personal computer or workstation to be able to fully appreciate the special application message.

Figure 2:
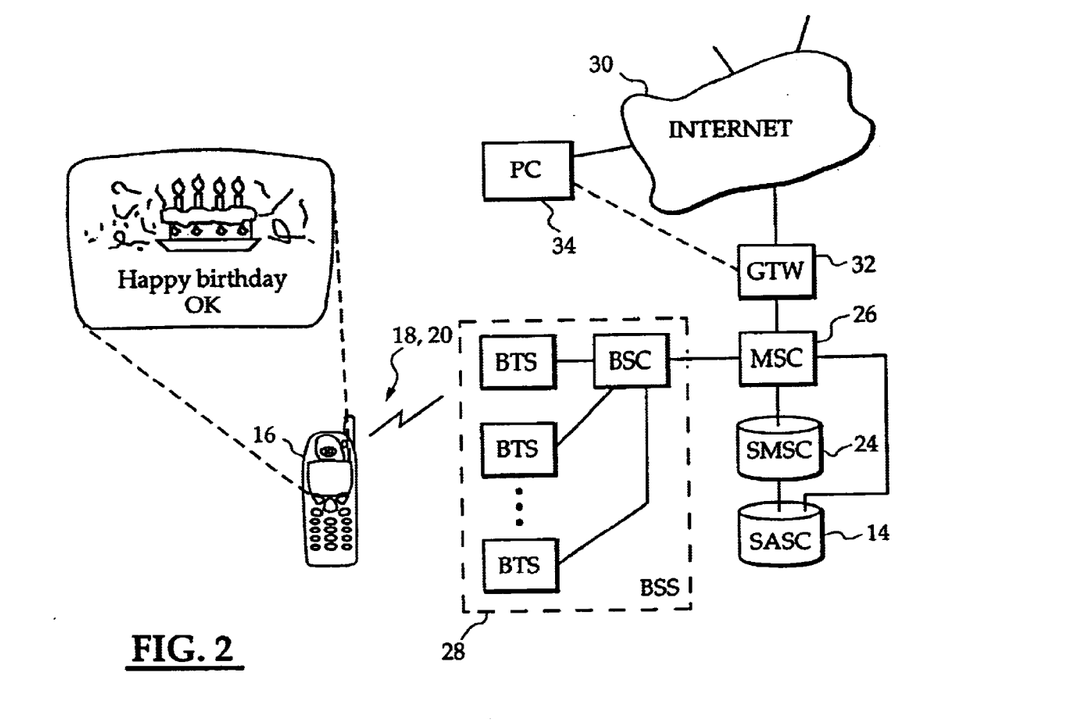
FIG. 2 shows the terminating mobile station of FIG. 1 in its normal operating mobile communications system environment and displaying a special content message provided to it from the originating mobile station of FIG. 1 via the special application service center, in this case a simple Graphic Message Service Center (GMSC).

The terminating mobile station 16 of FIG. 1 is shown in FIG. 2 with a display showing a special content (picture) message on a display. The picture message is provided using a graphic message service for providing short text greetings displayed below a black and white picture of, for example, 72×28 pixels (wxh). Such a picture message can be provided by the special (picture) application service center 14 shown in FIG. 2 connected to a mobile switching center 265 of a mobile communications system. FIG. 2 also shows a short message service center 22 connected to the mobile switching center 26 and to the SASC 14. These connections may be direct, as shown, or indirect, i.e., through other network entities. As known in the art, such an MSC 26 is connected to multiple base station subsystems 28, each of which includes multiple base transceiver stations (BTS) connected to a base station controller (BSC).

The MSC 26 may be connected to the internet 30 by means of a gateway 32. As explained above, the user of the terminating mobile station 16 of FIG. 1 can access a nearby PC 34 when his mobile station 16 is not capable of fully processing the special content message from the originating mobile station 10. By accessing the web page posted by the special application service center 14, the user can fully appreciate the message, even though his mobile station 16 is not as fully capable as the mobile station 10 of the originating user.

Figure 3:
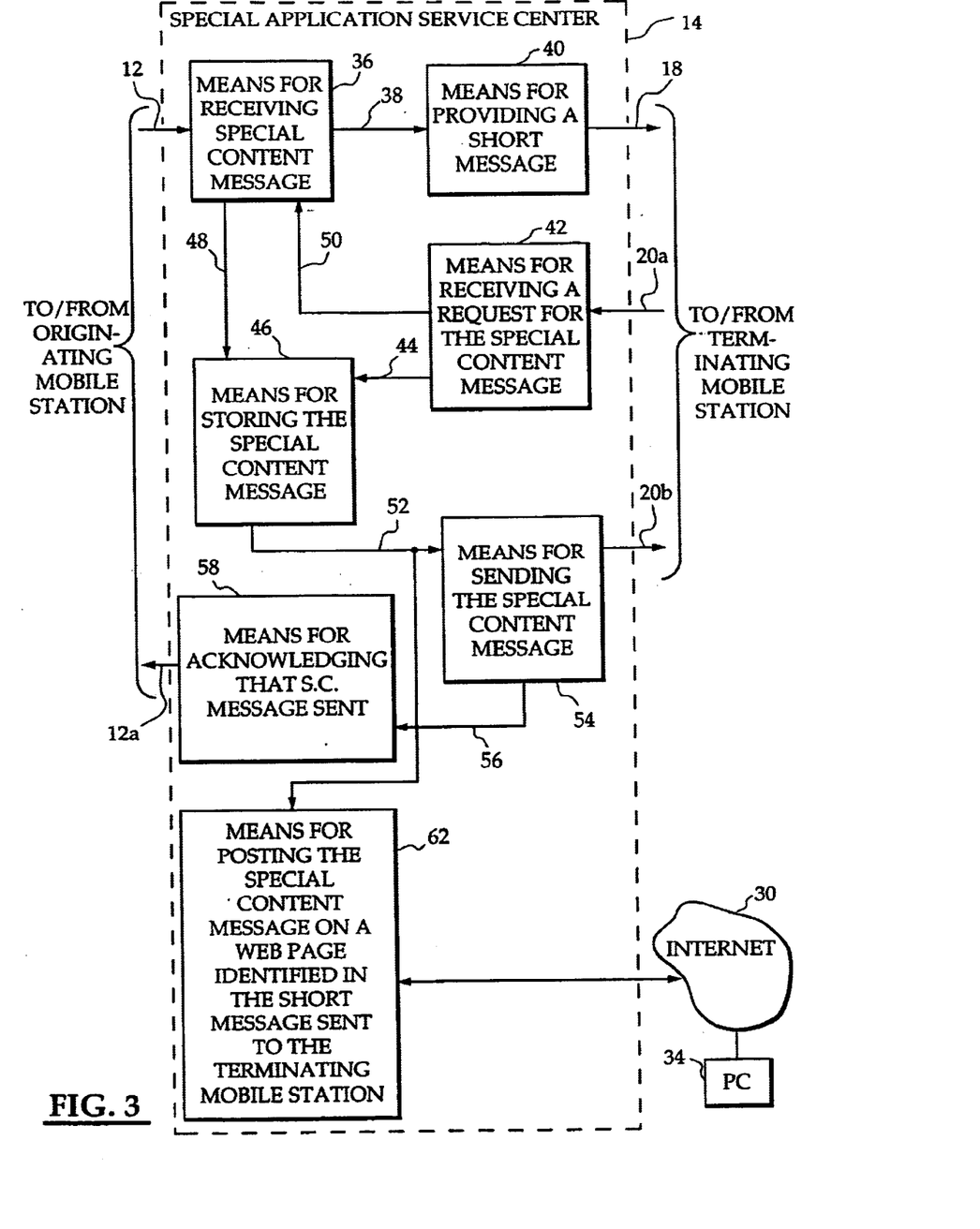
FIG. 3 shows a special application service center, according to the present invention, with those functions relevant to the present invention shown as functional blocks.
Figure 4:
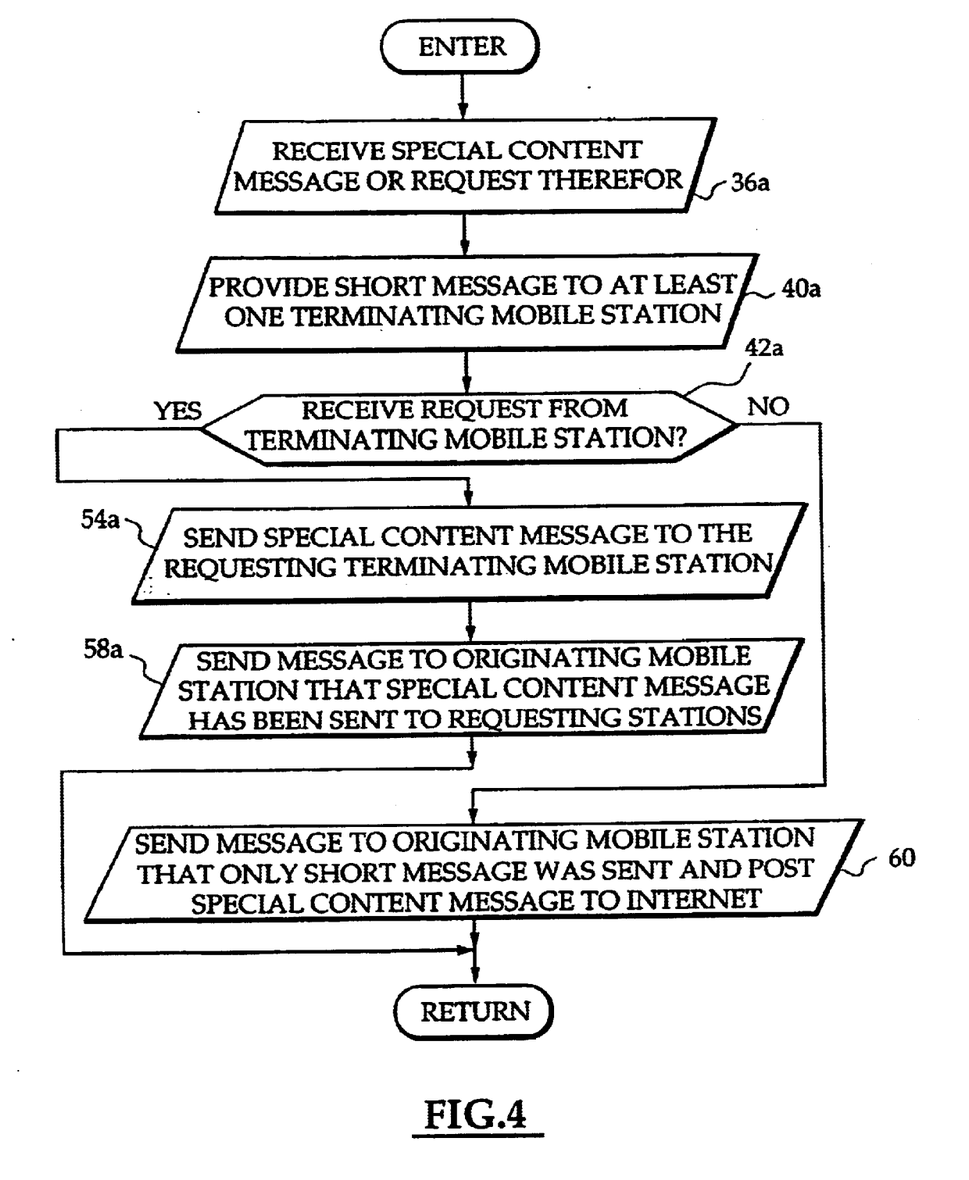
FIG. 4 shows a sequence of steps which may be carried out in the special application service center of FIG. 3, according to the present invention.

FIG. 3 shows by a plurality interconnected functional blocks the various functions carried out by the special application service center 14. As will be appreciated, these functions can be carried out on a general purpose digital computer using software in conjunction with various hardware devices. One such hardware device is means 36 for receiving the special content message (or a request that a special content message be sent) on the line 12 from the originating mobile station 10 of FIG. 1. This signal would be provided to the special application service center 14 through a mobile communication system infrastructure such as that shown in FIG. 2 or similar. In response to receiving the special content message or request therefor, a short message is composed similar to that described previously and provided on a line 38 to means 40 for providing the short message on the line 18 to the terminating mobile station 16 of FIG. 1. FIG. 4 shows a series of steps carried out in the special application service center 14 of FIG. 3, including steps 36a, 40a, which correspond to the functions carried out in the blocks 36, 40 of FIG. 3. If the terminating mobile station 16 is capable of receiving the special content message, it will send a request therefor on a line 20a back to the special application service center 14, where it is received by a means 42 for receiving the request for the special content message. It is then determined in the special application service center 14, for instance within the means 42, whether a request from the terminating mobile station has been received. If so, a retrieval request signal is provided on a line 44 to a memory means 46 within which the special content message has previously been stored by the means 36 for receiving same over a signal line 48. It is also possible that the special content message is temporarily stored in the means 36 until it receives a command signal on a line 50 from the means 42 and as shown by a step 42a in FIG. 4 after receiving the request from the terminating mobile station 16 on the line 20a. The means 36 for receiving could only then store the special content message in the memory means 46 over the line 48.

It is also possible, as suggested above, that the originating mobile terminal 16 has merely sent a request that a special content message be sent. In other words, although the originating mobile station 10 may be capable of composing special content messages by itself or may have a set of default special content messages stored within, it is also possible that the special application service center will have a large number of special content messages stored within that can be made available on an uplink 12a to the originating mobile station for further composition or that may be combined with a textual message from the originating mobile station 10 provided on the line 12 and sent on the line 18 to the terminating mobile station. In that case, the means 46 for storing the special content message would also be capable of storing a large number of special content messages that are available for use by originating mobile stations.

It should therefore be understood that the "providing" and "receiving" of a special content message from an originating mobile station 10 to the special application service center may (but need not) also encompass a request for a special content message from the originating mobile station which, after receiving same, will be fulfilled by the special application service center.

If the step 42a determines that a request has been received, the signal on the line 44 causes the contents of the memory means 46 to be read and provided on a line 52 to a means 54 for sending the special content message on a line 20b to the terminating mobile station 16, as also illustrated by a step 54a of FIG. 4. Once the special content message has been sent, the means 54 can provide a signal on a line 56 to a means 58 for acknowledging that the special content message has been sent. This acknowledgement is not necessary, but would cause the line 12 of FIG. 1 to be bidirectional. This step is shown as a step 58a in FIG. 4.

If it were determined in the step 42a that the terminating mobile station has not requested that the special content message be provided, a step 60 is executed instead, as shown in FIG. 4. In that step a message can be sent to the originating mobile station 10 on the line 12a that only the short message was sent to the terminating mobile station 16 and that the full special content message was posted on a web page available to users of the internet and maintained by the special application service center 14. Thus, FIG. 3 shows means 62 for posting the special content message (processed according to the special application) on a web page that is maintained in the special application service center and that was identified in the short message sent to the terminating mobile station in the step 40a of FIG. 4. It should be realized that it is not necessary to send any message back to the originating mobile station and that step 60 could simply consist of posting the special content message to the internet for access by the user of the terminating mobile station 16 by means of a PC 34.

Figure 5:
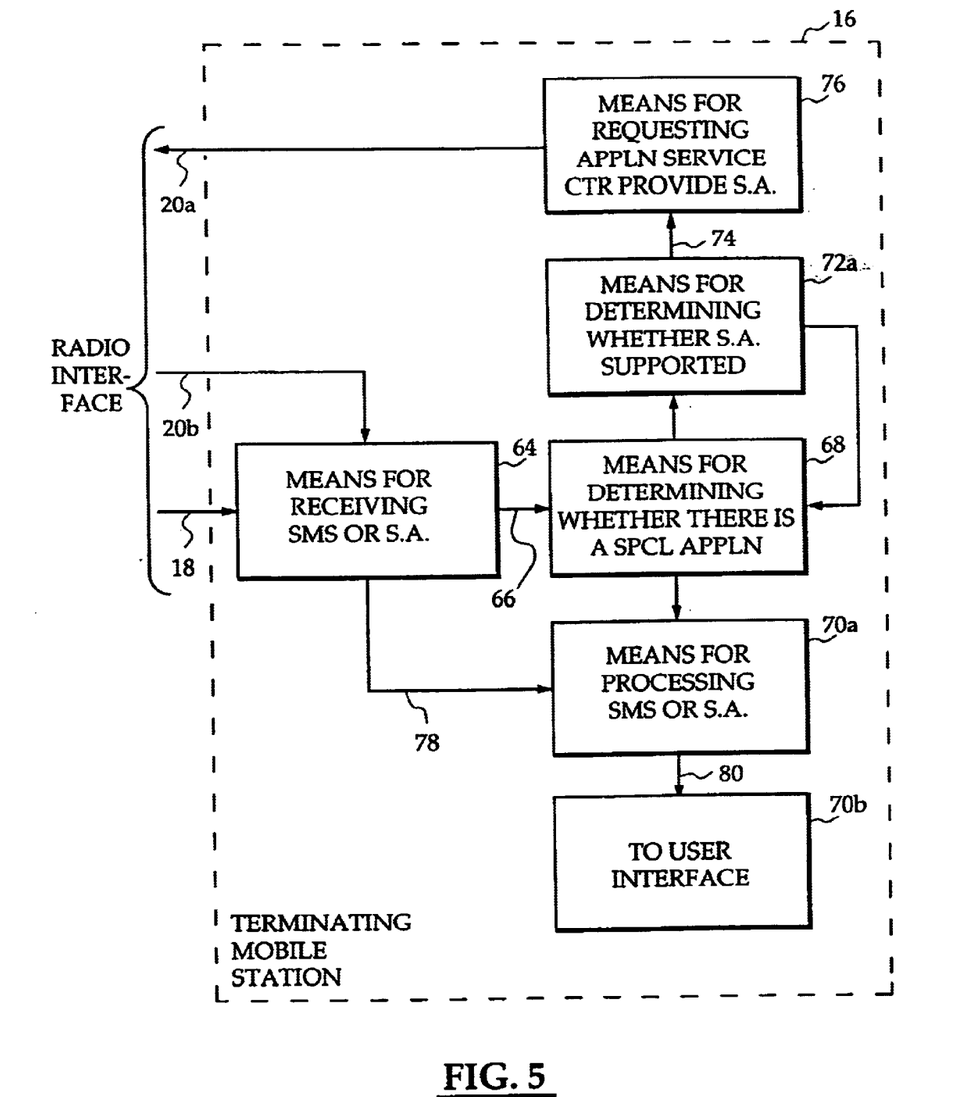
FIG. 5 shows functional blocks relevant to the present invention carried out in a terminating mobile station able to receive adapted messages from the special application service center of FIGS. 1–3.
Figure 6:
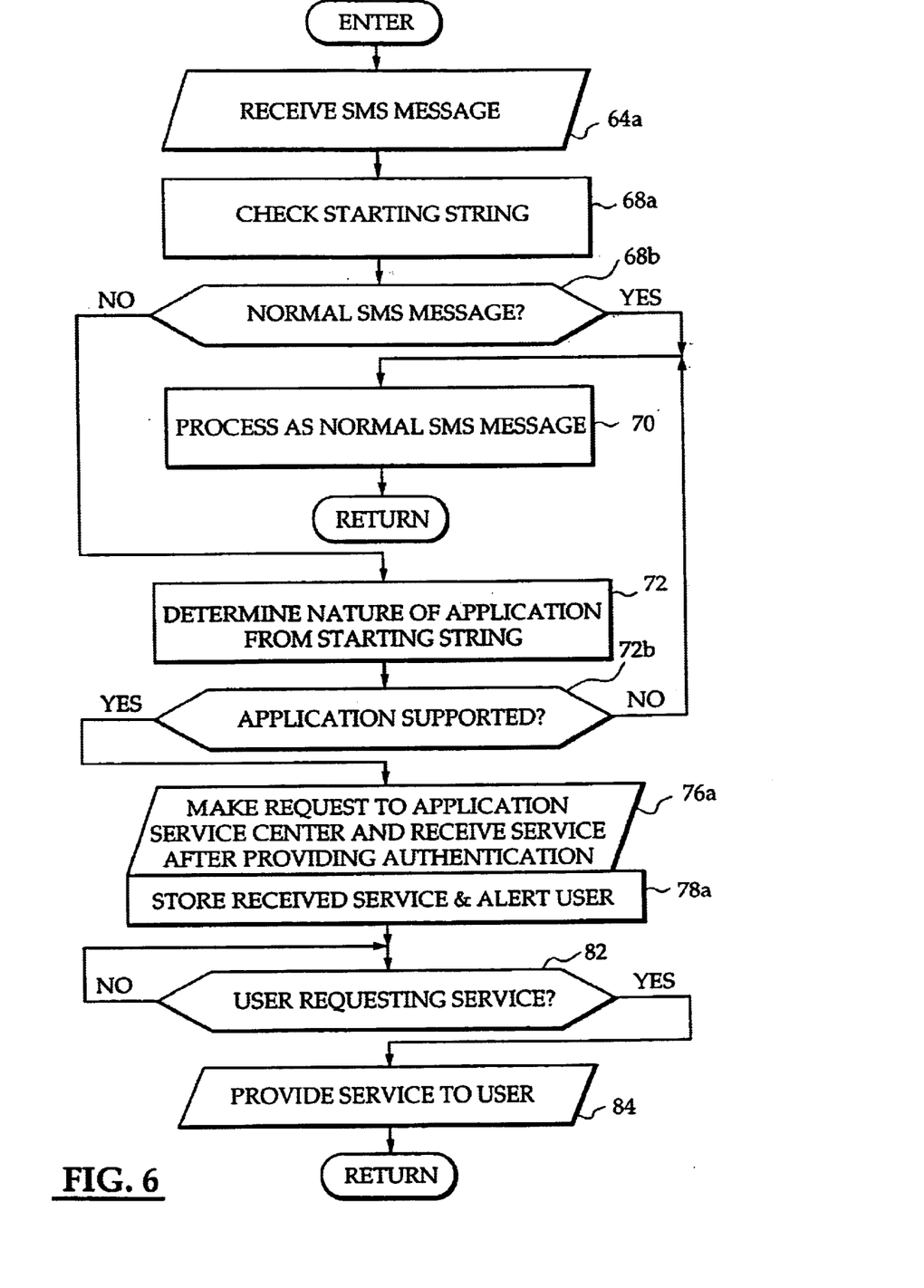
FIG. 6 shows a sequence of steps that may be carried out in the terminating mobile station of FIG. 5, according to the present invention.

FIG. 5 shows some of the functions of the terminating mobile station 16 which are pertinent to carrying out the present invention. It will be realized that the terminating mobile station is comprised of various hardware, including an antenna, a transceiver, a modulator, a demodulator, a controller, a display, a speaker, a microphone, a memory, a keypad, etc. The controller in conjunction with the memory are usually assigned the tasks that are shown in functional blocks in FIG. 6 and are normally carried out by software coded, e.g., according to a sequence of steps such as shown in FIG. 6. For instance, the short message provided on the line 18 from the special application service center 14 is received by means 64 for receiving the short message. As mentioned, the processing of this message would typically be carried out by a controller in the form of a microprocessor in conjunction with a program coded according to a step 64a shown in FIG. 6. The means 64 can then provide the short message on a line 66 to means 68 for checking a starting string, as indicated in a step 68a of FIG. 6 and determining, as indicated in a step 68b whether this is a normal SMS message or whether there is a special application indicated. By "normal" SMS message, in this context, is simply meant a message that does not indicate any special content application. If it is a normal SMS message, i.e., there is no special content indicated, the SMS message is processed as a normal short message and displayed on the display of the terminating mobile station 16 in the form of text, as indicated in a step 70. By "normal" SMS message, in this context, is meant a message that includes a short textual message that can be provided to the user interface for display, as is "normal" for SMS messages. This can be carried out by means 70a for processing the SMS message and means 70b for displaying same to the user.

If it were determined in the step 68b that there is a special content message, a step 72 is carried out by the means 68 or by means 72a for determining the nature of the application. The means 72a will then determine whether the application is supported by the terminating mobile station 16. This is illustrated by a step 72b in FIG. 6. If not, the message is processed as a normal SMS message by the means 70a, 70b as carried out by the step 70 of FIG. 6. If the application is supported, a signal is provided on a line 74 to a means 76 for requesting that the special application service center 14 send the special content message. This is signaled from the means 76 of the terminating mobile station 16 on the line 20a to the special application service center 14.

As indicated in the step 42a of FIG. 4, when the service center receives the request from the terminating mobile station, it sends the special content message to the requesting terminating mobile station, as indicated by the signal on the line 20b. Before executing the step 54a of FIG. 4, the special application service center of FIG. 3 can check to see if the requesting message came from the same terminating mobile station 16 to which the SMS message on the line 18 was sent, for instance, utilizing caller line identification (CLI). Since the special application service center 14 might have more than one number to which similar SMS messages have been sent, it is useful for the SASC 14 to be able to verify that a message coming from a particular number matches the number to which the original SMS message was sent. An error message can be sent to a terminating mobile station when a mismatch is detected. Or, a special string within the message on the signal line 20a can be searched for.

The means 64 for receiving the special content message provides the special content message on a line 78 to the means 70a which stores the special content message and may alert the user by sending a signal on a line 80 to the user interface 70b, which may have a mechanism for alerting the user to the arrival of a message.

As shown by a step 82 in FIG. 6, if the user then requests the service, for instance by pushing a button, the means 70a for processing the special content message according to the corresponding special application program provides the message to the user over the signal line 80 to the user interface 70b, and as indicated by a step 84 of FIG. 6. In this way, the user with a terminating mobile station 16 that is comparable in capabilities to that of the originating mobile station 10 can fully appreciate the message without having to consult a PC 34.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. Method for use by a mobile station in a mobile communications system in receiving a service from an application service center, comprising the steps of:

the mobile station receiving a short message;

the mobile station determining whether the short message indicates that a special application is required in the mobile station and, if not, processing the short message as a short message and, if so, determining whether the special application is supported in the mobile station and, if not, processing the short message as a short message and, if so, requesting an application service center to provide a service usable according to the special application;

the mobile station receiving the service in the form of a special content message from the application service center; and the mobile station processing the special content message according to the special application.

2. Method for use by an application service center in providing a special content message provided by an originating mobile station in a mobile communications system to a terminating mobile station in the system, comprising the steps of:

the center receiving the special content message from the originating mobile station with a request to send the special content message to the terminating mobile station and providing a short message to the terminating mobile station with a part of the short message indicating that a special application is required in the terminating mobile station to fully process the special content message and with a textual part of the short message for use by the terminating mobile station in the event that the special application is not supported by the terminating mobile station;

the center receiving a request from the terminating mobile station that the special content message be sent, if the special application is supported in the terminating mobile station; and the center sending the special content message to the terminating mobile station in response to the request from the terminating mobile station or in the absence of the request from the terminating mobile station, posting the special content message on an internet web page accessible according to the textual part of the short message.

3. Method for use in a mobile communications system including an application service center for providing a special content message provided by an originating mobile station of the system to a terminating mobile station of the system, said method comprising the steps of:

the center receiving the special content message from the originating mobile station with a request to send the special content message to the terminating mobile station and providing a short message to the terminating mobile station with a part of the short message indicating that a special application is required in the terminating mobile station to fully process the special content message and with a textual part of the short message for use by the terminating mobile station in the event that the special application is not supported by the terminating mobile station;

the terminating mobile station receiving the short message;

the terminating mobile station determining whether the short message indicates that a special application is required in the terminating mobile station and, if not, processing the short message as a short message and, if so, determining whether the special application is supported in the terminating mobile station and, if not, processing the short message as a short message and, if so, sending a request to the application service center to provide the special content message;

the center receiving the request from the terminating mobile station that the special content message be sent;

the center sending the special content message to the terminating mobile station;

the terminating mobile station receiving the special content message from the application service center; and the terminating mobile station providing the special content message to the user according to the special application.

4. Mobile station for use in a mobile communications system for receiving a service from an application service center, comprising:

means for receiving a short message;

means for determining whether the short message indicates that a special application is required in the mobile station and, if not, processing the short message as a short message and, if so, determining whether the special application is supported in the mobile station and, if not, processing the short message as a short message and, if so, requesting that the application service center provide a special content message for processing in the mobile Station according to the special application;

means for receiving the special content message from the application service center; and means for providing the special content message to a user of the mobile station according to the special application.

5. Application service center for use in providing a special content message requested or provided by an originating mobile station in a mobile communications system to a terminating mobile station in the system, comprising:

means for receiving the special content message from the originating mobile station with a request to send the special content message to the terminating mobile station;

means for providing a short message to the terminating mobile station with a part of the short message indicating that a special application is required in the terminating mobile station to fully process the special content message and with a textual part of the short message for use by the terminating mobile station in the event that the special application is not supported by the terminating mobile station;

means for posting said special content message to a web page accessible according to said short message in said event;

means for receiving a request from the terminating mobile station that the special content message be sent, if the special application is supported in the terminating mobile station; and means for sending the special content message to the terminating mobile station.

6. Mobile communications system, comprising:

an originating mobile station for providing a special content message with a destination address;

a terminating mobile station with the destination address provided by the originating mobile station for receiving the special content message;

an application service center for receiving the special content message from the originating mobile station with a request to send the special content message to the terminating mobile station, the center for providing a short message to the terminating mobile station with a part of the short message indicating that a special application is required in the terminating mobile station to fully process the special content message and with a textual part of the short message for use by the terminating mobile station in the event hat the special application is not supported by the terminating mobile station and including means for posting said special content message to a web page accessible according to said short message in said event;

wherein the terminating mobile station includes means for receiving the short message, means for determining whether the short message indicates that a special application is required in the terminating mobile station and, if not, processing the short message as a short message and, if so, determining whether the special application is supported in the terminating mobile station and, if not, processing the short message as a normal short message and, if so, sending a request to the application service center to provide a service usable according to the special application;

the center having means for receiving the request from the terminating mobile station that the special content message be sent, as well as means for sending the special content message to the terminating mobile station;

wherein the terminating mobile station has means for receiving the special content message from the application service center, as well as means for providing the special content message to a user of the terminating mobile station according to the special application.

7. The method of claim 1, wherein the short message is a Short Message Service (SMS) message employing bandwidth of signaling channels for transmitting short text messages substantially similar to paging messages.

8. The method of claim 1, wherein the short message is processed by the mobile station as a normal short message only if the short message is a normal short message or if the short message is indicative of an application that the mobile station determines is not supported by the mobile station.

9. The method of claim 8, wherein if the short message is indicative of an application, then the short message indicates an alternative method for the user to obtain the service from a service resource.

10. The method of claim 9, wherein the service resource is a resource that is also identifiable when requesting the application service center to provide the service usable according to the special application.

* * * * *

UNITED STATES PATENT AND TRADEMARK OFFICE
CERTIFICATE OF CORRECTION

PATENT NO. : 6,795,711 B1
DATED : September 21, 2004
INVENTOR(S) : T. Sivula

It is certified that error appears in the above-identified patent and that said Letters Patent is hereby corrected as shown below:

Title page,
Item [56], References Cited, U.S. PATENT DOCUMENTS, please delete
"5,946,663 A  8/1999  Tanaka et al.  455/466".

Column 12,
Line 33, please change "hat" to -- that --.

Signed and Sealed this

Twenty-third Day of August, 2005

JON W. DUDAS
*Director of the United States Patent and Trademark Office*

UNITED STATES PATENT AND TRADEMARK OFFICE
CERTIFICATE OF CORRECTION

PATENT NO. : 6,795,711 B1
DATED : September 21, 2004
INVENTOR(S) : T. Sivula It is certified that error appears in the above-identified patent and that said Letters Patent is hereby corrected as shown below:

<u>Title page,</u>
Insert Item
-- [73] Assignee: Nokia Mobile Phones Ltd.
　　　　　　　　　Tampere, Finland --.

Signed and Sealed this

Seventh Day of February, 2006

JON W. DUDAS
*Director of the United States Patent and Trademark Office*